(12) United States Patent
Vishal

(10) Patent No.: US 6,516,399 B2
(45) Date of Patent: Feb. 4, 2003

(54) DYNAMICALLY CONFIGURABLE PAGE TABLE

(75) Inventor: Anand Vishal, Sunnyvale, CA (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 111 days.

(21) Appl. No.: 09/822,889

(22) Filed: Mar. 30, 2001

(65) Prior Publication Data

US 2002/0144072 A1 Oct. 3, 2002

(51) Int. Cl.[7] ............................................. G06F 12/10
(52) U.S. Cl. ...................... 711/206; 711/106; 711/128
(58) Field of Search ............................... 711/128, 170, 711/206, 207, 106

(56) References Cited

U.S. PATENT DOCUMENTS 5,752,275 A * 5/1998 Hammond .................. 711/207
5,978,888 A * 11/1999 Arimilli et al. ............. 711/128
6,330,639 B1 * 12/2001 Fanning et al. ............. 711/106

* cited by examiner

Primary Examiner—Gary J Portka
(74) Attorney, Agent, or Firm—Peter Zawilski

(57) ABSTRACT

The reliability and operability of semiconductor devices is improved using a circuit arrangement and method that improves the ability to manage data storage and retrieval. According to one example embodiment of the present invention, a memory device includes a dynamically configurable page table having a plurality of pages. The page table is dynamically configurable to at least two organizations, and each page includes a multitude of memory storage locations adapted to store data. A controller is adapted to track memory requests and to configure the page table to one of the at least two organizations during a memory refresh cycle, wherein the configuration is effected in response to the tracked memory requests. In this manner, the page table can be adapted to improve the effectiveness and speed of data storage and retrieval.

21 Claims, 2 Drawing Sheets

DYNAMICALLY CONFIGURABLE PAGE TABLE

FIELD OF THE INVENTION

The present device relates generally to semiconductor devices and, more particularly, to semiconductor device memory.

BACKGROUND OF THE INVENTION

In recent years, the semiconductor industry has realized tremendous advances in technology which have permitted dramatic increases in circuit density and complexity, and equally dramatic decreases in power consumption and package sizes. Present semiconductor technology now permits single-chip microprocessors with many millions of transistors, operating at speeds of hundreds of MIPS (millions of instructions per second) to be packaged in relatively small, air-cooled semiconductor device packages. In addition, the increased speed of operation has resulted in a widespread demand for the use of products that incorporate semiconductor devices, such as computers, cellular phones and other electronic products.

For example, in semiconductor ASIC devices there is logic implemented to track certain events that are then used to either enforce pre-chosen algorithm or policies. Some examples of these include Arbiters that decide the type of access to grant to a particular agent based on a policy Cache controller that maps a much bigger slow memory space into a small fast memory based on certain mapping scheme TLB's that map a bigger virtual space into a smaller physical memory space based on a mapping scheme.

In the case of memory controllers using multiple internal bank organization, page tables track open pages. Due to the large number of memory banks that exist in these and other applications, typical page tables can not store every possible page open, and page table designs have had to compromise between the number of entries that can be stored and the time required to access data stored in the page table.

SUMMARY OF THE INVENTION

The present invention makes possible dynamic configuration of memory page tables, and addresses problems stated in the Background hereinabove. The present invention is exemplified in a number of implementations and applications, some of which are summarized below.

According to an example embodiment of the present invention a memory device includes a page table having a plurality of pages, each page having a multitude of memory storage locations adapted to store data. The page table is dynamically configurable to at least two organizations. A controller is adapted to track memory requests and to configure the page table to one of the at least two organizations during a memory refresh cycle. The configuration of the page table is effected in response to the tracked memory requests. In this manner, difficulties associated with memory storage, including those described hereinabove in the Background are addressed, and the need to compromise between the number of entries that can be stored and the time required to access data stored in the page table can be reduced.

According to a more specific example embodiment of the present invention, a controller is adapted to configure the page table to at least one of a first organization and a second organization. The first organization is characterized by fewer data management conflict misses relative to the second organization, and the second organization is characterized by a faster data access time relative to the first organization.

In another example embodiment of the present invention, a method is used for storing data in a memory. The method includes storing data in a page table having a plurality of pages, wherein each page has a multitude of memory storage locations adapted to store data. The page table is dynamically configurable to at least two organizations. Memory requests are tracked, and the page table is configured to one of the at least two organizations during a memory refresh cycle. The configuration is effected in response to the tracked memory requests.

The above summary is not intended to describe each illustrated embodiment or every implementation of the present invention. The figures and detailed description that follow more particularly exemplify these embodiments.

BRIEF DESCRIPTION OF THE DRAWINGS

The invention may be more completely understood in consideration of the following detailed description of various embodiments of the invention in connection with the accompanying drawing, in which.

Figure 1:
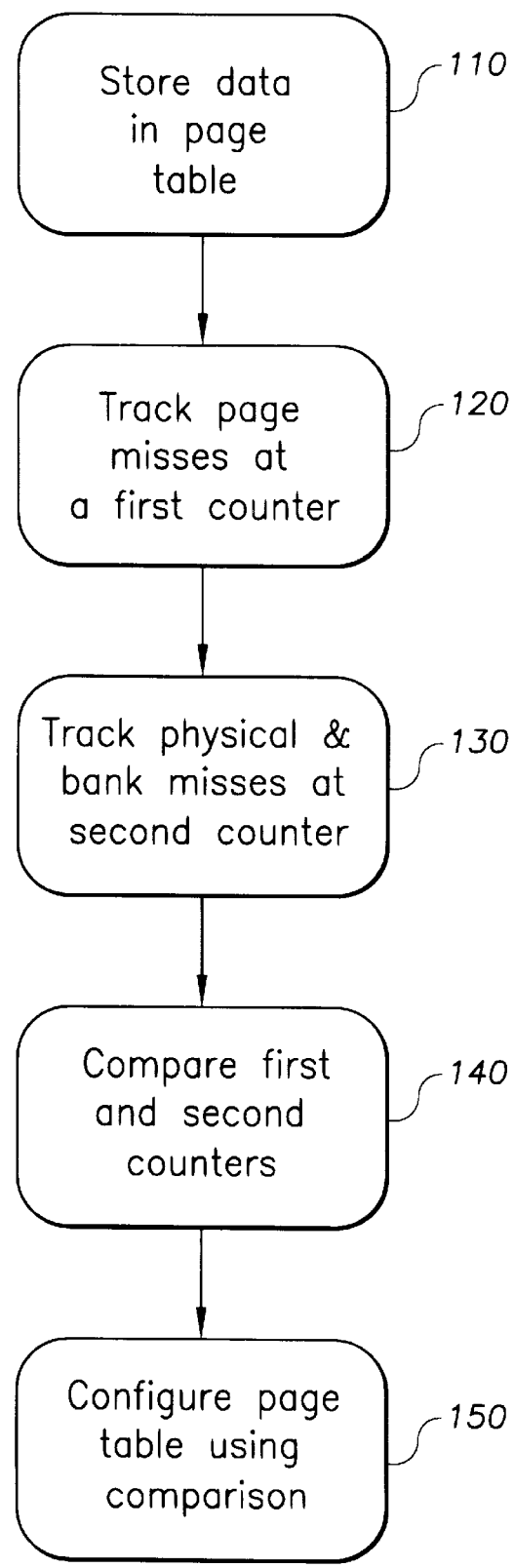
FIG. 1 is a flow diagram for dynamically configuring a page table, according to an example embodiment of the present invention.

While the invention is amenable to various modifications and alternative forms, specifics thereof have been shown by way of example in the drawing and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION

The present invention is believed to be applicable to a variety of different types of semiconductor devices, and has been found to be particularly suited for use in connection with memory controllers. While the present invention is not limited to such devices, an appreciation of various aspects of the invention is best gained through a discussion of various examples using this application.

According to an example embodiment of the present invention, a memory controller is adapted to take advantage of a memory refresh cycle by configuring a page table in the memory during the refresh cycle in response to the type of memory access that the page table has undergone. Memory lookups from the page table are tracked and the page table is configured to an organization that suits the type of memory lookups that the page table is undergoing. One type of organization includes a fully associative organization, wherein any memory request can occupy any entry on the page table and typically exhibits multiple clock lookup times. Another type of organization includes a set associative organization, wherein a memory request can be stored only in a particular set and typically exhibits lookup times less than a single clock cycle. In typical memory devices, refresh cycles occur at periodic intervals during which open pages are closed, which makes possible dynamic reconfiguration of the page table to an organization, such as fully associative or set associative, without necessarily moving data entries on the page table and without losing performance. In this manner, the ability of the memory to provide fast data access while maintaining a sufficient quality of memory storage is improved.

The example embodiments described herein are adaptable for use in connection with a variety of memory types using page tables, including DRAM (dynamic RAM), SDRAM (Synchronous Dynamic Random Access Memory), DDR (double data rate) and those manufactured by Rambus, Inc. of Santa Clara, Calif. Each memory type has a configuration in which memory can be stored. For example, a typical single SDRAM can have 4 internal memory banks, and a system could have 8 physical SDRAM SIMMs, giving a maximum of 32 banks in the system. Similarly, a single Rambus chip can have 16 internal banks and a total of 32 physical RDRAM for a maximum of 512 banks. Each bank at any time can hold one row (e.g., a page). Typically, memory storage is related to a physical storage device (e.g., a SIMM), internal banks of memory in each storage device, and pages in each bank.

FIG. 1 shows a more particular example embodiment of the present invention, wherein the memory controller includes two or more counters. Data is stored in the page table at block 110. A first one of the counters is adapted to track page misses that exhibit a physical and bank hit at block 120, and a second one of the counters is adapted to track physical and bank misses at block 130. For instance, one type of miss that can be tracked includes a conflict miss that occurs as a result of a data collision. For every memory access, the input address of the access is compared to existing entries in the page table and a determination is made as to whether the access is a hit to a currently open page or a miss. The least recently used (LRU) entries on the page table are tracked on a fully associative basis, and when the page table is in a set-associative organization, the second counter only tracks misses that did not replace LRU entries. Typical action taken for a lookup result may include, for example, using entries that exhibit physical, bank and row (page) matches as a most recently used entry; using entries that exhibit physical and bank matches but row (page) mismatches and pre-charging the current page being used; and using a LRU entry when physical and bank mismatches are encountered.

When the page table goes into a memory refresh cycle, the counters are compared at block 140 and used to determine whether or not to change the organization of the page table. When the physical and bank misses are greater than the page misses, the page table is configured to a fully associative organization at block 150, unless the page table is already in a fully associative organization, wherein the organization remains unchanged. The fully associative configuration can provide characteristics that may include, for example, fewer data management conflict misses relative to a set associative organization. When the page misses are greater than the physical and bank misses, the organization of the page table is changed to set associative at block 150, unless the page table is already in the set associative organization, wherein the organization remains unchanged. The set associative organization can provide, for example, characteristics including a faster data access time relative to the first organization. In one particular implementation, the organization of the page table is changed only when the difference in the counters is greater than a selected amount, such as by an amount selected via a user input.

Figure 2:
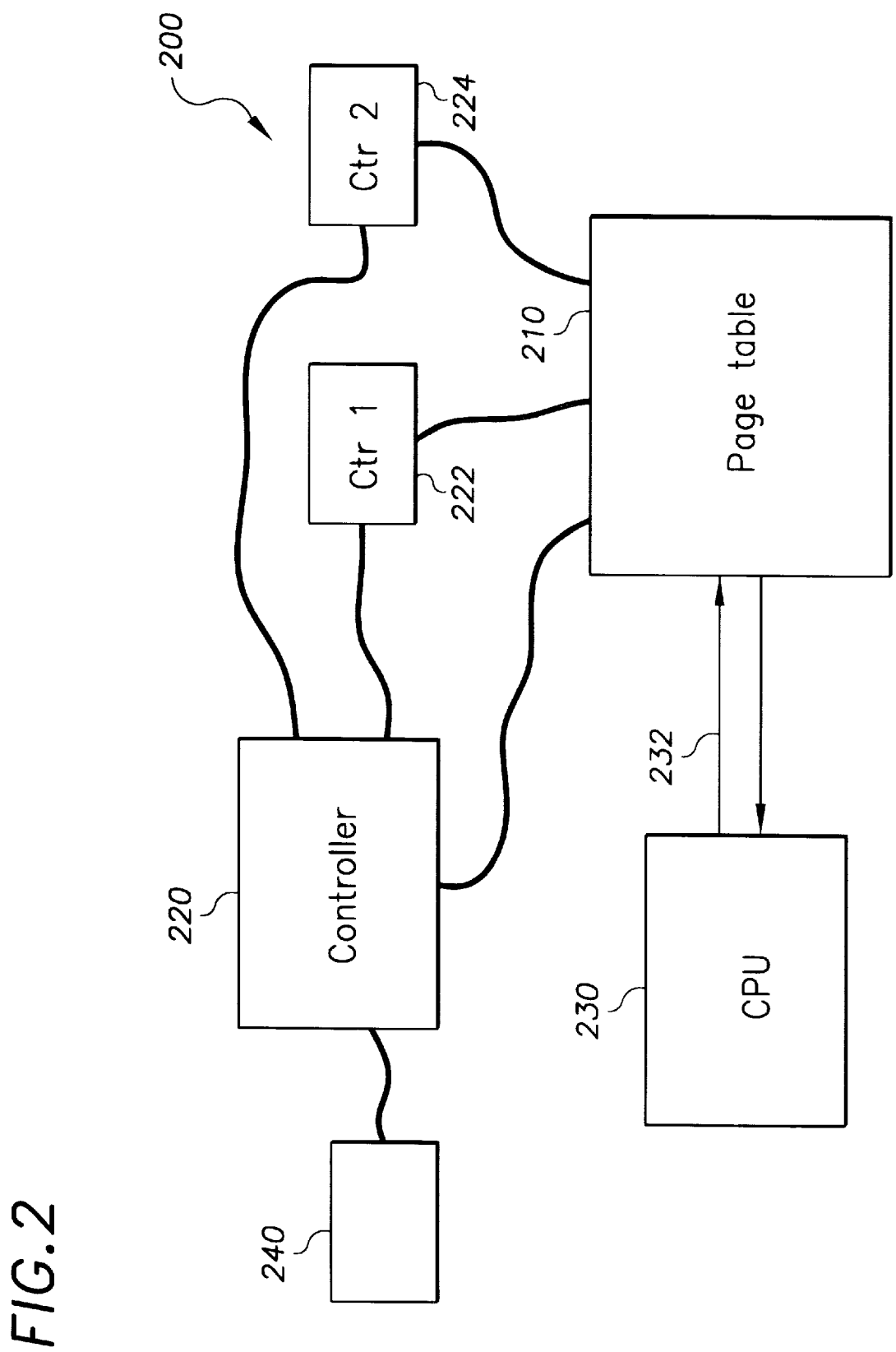
FIG. 2 is a circuit including a dynamically configurable page table, according to another example embodiment of the present invention.

FIG. 2 shows a dynamically configurable memory device 200, according to another example embodiment of the present invention. The memory device includes a page table 210 adapted to be configured to one of at least two organizations, including a fully associative organization and a set associative organization. A controller 220 is coupled to first and second counters 222 and 224, respectively, a user input 240 is coupled to the controller and a CPU 230 is adapted to send and receive data to the page table via a communications link 232. The first counter 222 is adapted to track page misses at the page table 210 that exhibit a physical and bank hit. The second counter 224 is adapted to track physical and bank misses at the page table. The user input is adapted to accept an input value from the user and to provide the value to the controller.

The controller includes a tracking circuit adapted to track the memory requests via the counters 222 and 224 and a comparison circuit adapted to compare the values of the counters. The controller is adapted to configure the organization of the page table 210 in response to the comparison when the page table is undergoing a memory refresh. A user inputs an offset value for changing to each of the different organizations that the page table can be configured to. When the page table is configured to a set associative organization, the organization is changed to a fully associative organization when the value of the second counter is greater than the value of the first counter plus a user-provided offset value for changing to fully associative. When the page table is configured to a fully associative organization, the organization is changed to a set associative organization when the value of the first counter is greater than the value at the second counter plus a user-provided offset value for changing to set associative.

While the present invention has been described with reference to several particular example embodiments, those skilled in the art will recognize that many changes may be made thereto without departing from the spirit and scope of the present invention, which is set forth in the following claims.

What is claimed is:

1. A memory device comprising:
   a page table having a plurality of pages, each page having a multitude of memory storage locations adapted to store data, the page table being dynamically configurable to at least two organizations; and
   a controller adapted to track memory requests and to configure the page table to one of the at least two organizations during a memory refresh cycle, the configuration being effected in response to the tracked memory requests.

2. The memory device of claim 1, wherein the controller is adapted to configure the page table to at least one of:
   a fully associative organization; and
   a set associative organization.

3. The memory device of claim 2, wherein the fully associative organization is characterized by a multiple clock cycle lookup access time.

4. The memory device of claim 2, wherein the set associative organization is characterized by a lookup time that is less than a single clock cycle.

5. The memory device of claim 1, wherein the controller is adapted to configure the page table to at least one of a first organization and a second organization; the first organization being characterized by fewer data management conflict misses relative to the second organization, and the second organization being characterized by a faster data access time relative to the first organization.

6. The memory device of claim 1, wherein the controller includes a tracking circuit adapted to track the memory requests and a configuration circuit adapted to configure the page table to one of the at least two organizations in response to the tracked memory requests.

7. The memory device of claim 1, wherein the controller is adapted to configure the page table during a memory refresh when open page tables are closed.

8. The memory device of claim 1, wherein the controller is adapted to change the organization of the page table without moving memory entries.

9. The memory device of claim 1, wherein the controller is adapted to maintain two counters, a first counter being adapted to track page misses that exhibit a physical and bank hit; a second counter being adapted to track physical and bank misses.

10. The memory device of claim 9, wherein the controller is adapted to only track misses that do not replace LRU storage locations for data entries in response to the page table organization being set associative.

11. The memory device of claim 9, wherein the controller is adapted to track the LRU of data entries in the table on a fully associative basis.

12. The memory device of claim 9, wherein the first and second counters are adapted to store a value representing the number of tracked misses for each counter, wherein the controller is further adapted to compare the stored values and to configure the page table to fully associative in response to the number of physical and bank misses being greater than the number of page misses that exhibit a physical and bank hit, and to configure the page table to set associative in response to the number of page misses that exhibit a physical and bank hit being greater than the number of physical and bank misses.

13. The memory device of claim 9, wherein the controller is adapted to change the configuration of the page table from set associative to fully associative in response to the number of physical and bank misses being a selected amount greater than the number of page misses that exhibit a physical and bank hit.

14. The memory device of claim 13, wherein the controller is adapted to receive a user input and to set the selected amount in response to the user input.

15. The memory device of claim 9, wherein the controller is adapted to change the configuration of the page table from fully associative to set associative in response to the number of page misses that exhibit a physical and bank hit being a selected amount greater than the number of physical and bank misses.

16. The memory device of claim 15, wherein the controller is adapted to receive a user input and to set the selected amount in response to the user input.

17. The memory device of claim 1, wherein the controller is adapted to track the LRU storage locations for data entries in the table on a fully associative basis.

18. A data storage arrangement comprising:
a memory having a page table adapted to store data and to make the stored data accessible in response to a request, the page table having a plurality of pages, each page having a multitude of memory storage locations adapted to store the data, the page table being dynamically configurable to at least two organizations during a memory refresh cycle;
a first counter adapted to track page misses that exhibit a physical and bank hit;
a second counter adapted to track physical and bank misses;
a comparison arrangement adapted to compare the misses tracked by the first and second counters; and
a controller adapted to configure the page table to one of the at least two organizations during a memory refresh cycle, the configuration being effected in response to the comparison.

19. A memory device comprising:
means for storing data, the means having a plurality of pages, each page having a multitude of memory storage locations adapted to store data, the means for storing data being dynamically configurable to at least two organizations; and
control means adapted to track memory requests and to configure the means for storing data to one of the at least two organizations during a memory refresh cycle, the configuration being effected in response to the tracked memory requests.

20. A method for storing data in a memory, the method comprising:
storing data in a page table having a plurality of pages, each page having a multitude of memory storage locations adapted to store data, the page table being dynamically configurable to at least two organizations; and
tracking memory requests and configuring the page table to one of the at least two organizations during a memory refresh cycle, the configuration being effected in response to the tracked memory requests.

21. The method of claim 20, wherein tracking memory requests includes tracking page misses that exhibit a physical and bank hit at a first counter and tracking physical and bank misses at a second counter, and wherein configuring the page table includes comparing the misses tracked at the first and second counters and changing the configuration of the page table from set associative to fully associative when the page table is in a set associative configuration and in response to the number of physical and bank misses being a selected amount greater than the number of page misses that exhibit a physical and bank hit, and changing the configuration of the page table from fully associative to set associative when the page table is in a fully associative configuration and in response to the number of page misses that exhibit a physical and bank hit being a selected amount greater than the number of physical and bank misses.

* * * * *